(12) United States Patent
Børsheim et al.

(10) Patent No.: US 11,196,125 B2
(45) Date of Patent: Dec. 7, 2021

(54) EXHAUST SYSTEM

(71) Applicant: SIEMENS ENERGY AS, Oslo (NO)

(72) Inventors: Eirik Børsheim, Oslo (NO); Haakon Torgersen, Heimdal (NO); Espen Haugan, Trondheim (NO)

(73) Assignee: SIEMENS ENERGY AS, Oslo (NO)

( * ) Notice: Subject to any disclaimer, the term of this patent is extended or adjusted under 35 U.S.C. 154(b) by 149 days.

(21) Appl. No.: 16/647,151

(22) PCT Filed: Sep. 17, 2018

(86) PCT No.: PCT/EP2018/075028
§ 371 (c)(1),
(2) Date: Mar. 13, 2020

(87) PCT Pub. No.: WO2019/057656
PCT Pub. Date: Mar. 28, 2019

(65) Prior Publication Data
US 2021/0036283 A1    Feb. 4, 2021

(30) Foreign Application Priority Data
Sep. 22, 2017 (GB) .................................... 1715391

(51) Int. Cl.
*H01M 50/30* (2021.01)
*H01M 10/613* (2014.01)
(Continued)

(52) U.S. Cl.
CPC ......... *H01M 50/30* (2021.01); *H01M 10/613* (2015.04); *H01M 10/625* (2015.04);
(Continued)

(58) Field of Classification Search
None
See application file for complete search history.

(56) References Cited

U.S. PATENT DOCUMENTS 1,416,214 A * 5/1922 King .................... H01M 50/30
429/71
2009/0088062 A1   4/2009 Major et al.
(Continued)

FOREIGN PATENT DOCUMENTS

JP    H06104007 A    4/1994
JP    2009225526 A    10/2009
(Continued)

*Primary Examiner* — Gregg Cantelmo

(57) ABSTRACT

An exhaust system for energy storage modules connected in series in a cubicle and energy storage cubicles connected in parallel. A cubicle exhaust duct is connected to each of the storage modules in one cubicle and an opening between each of the storage modules and the exhaust duct. A common exhaust duct is connected to each cubicle exhaust duct, an extractor fan, a fluid inlet for the extractor fan with a duct connected to a source of air and a fluid outlet for the extractor fan. A cross section of the fluid inlet is smaller than the fluid outlet. An entry of the fluid inlet and an exit of the fluid outlet are outside the storage device and outside a compartment of the storage device. The extractor fan circulates air and creates an under-pressure in the common exhaust duct and cubicle exhaust ducts to guide gas out the exhaust ducts.

6 Claims, 4 Drawing Sheets

(51) Int. Cl.
*H01M 10/6563* (2014.01)
*H01M 10/6566* (2014.01)
*H01M 50/20* (2021.01)
*H01M 50/383* (2021.01)
*H01M 50/251* (2021.01)
*H01M 10/627* (2014.01)
*H01M 50/204* (2021.01)
*H01M 10/625* (2014.01)
*H01M 50/249* (2021.01)

(52) U.S. Cl.
CPC ..... *H01M 10/627* (2015.04); *H01M 10/6563* (2015.04); *H01M 10/6566* (2015.04); *H01M 50/20* (2021.01); *H01M 50/204* (2021.01); *H01M 50/249* (2021.01); *H01M 50/251* (2021.01); *H01M 50/383* (2021.01); *H01M 2220/10* (2013.01); *H01M 2220/20* (2013.01)

(56) References Cited

U.S. PATENT DOCUMENTS

2011/0159326 A1* 6/2011 Oya .................... H01M 10/625
429/82
2015/0004458 A1 1/2015 Lee

FOREIGN PATENT DOCUMENTS

| | | |
|---|---|---|
| JP | 2016018638 A | 2/2016 |
| WO | 2014155520 A1 | 10/2014 |

* cited by examiner

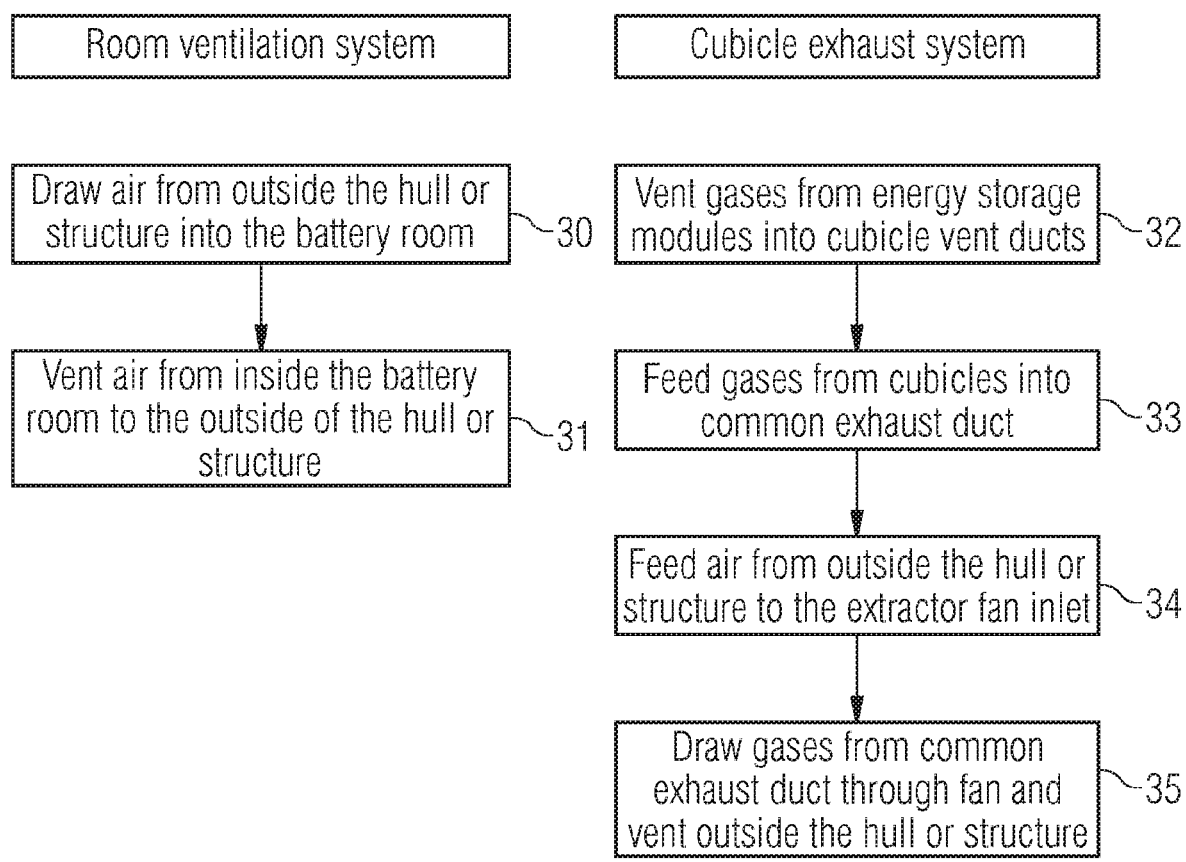

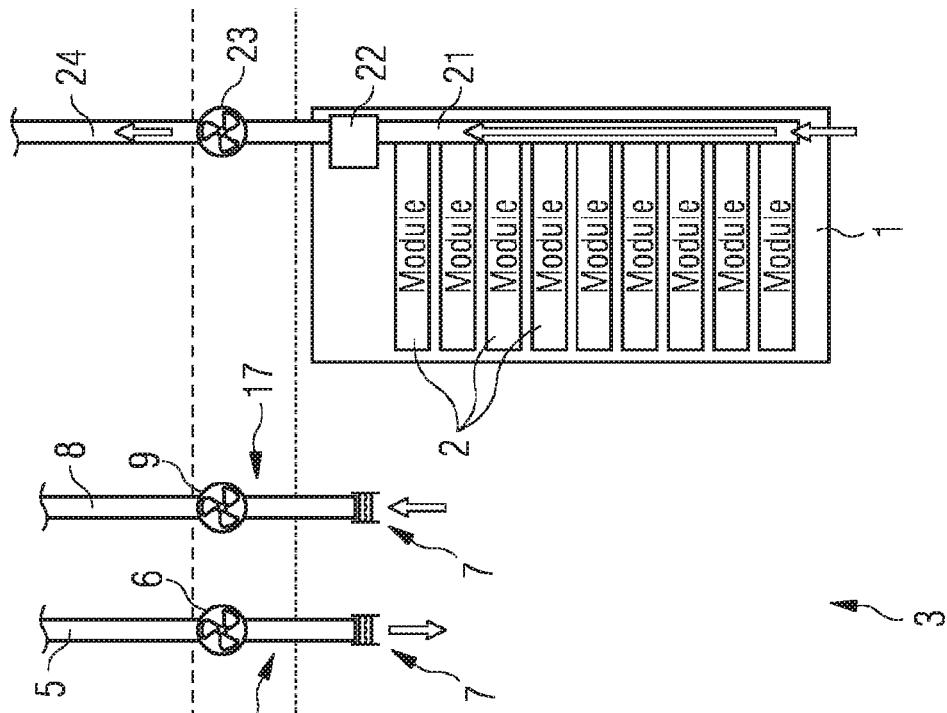
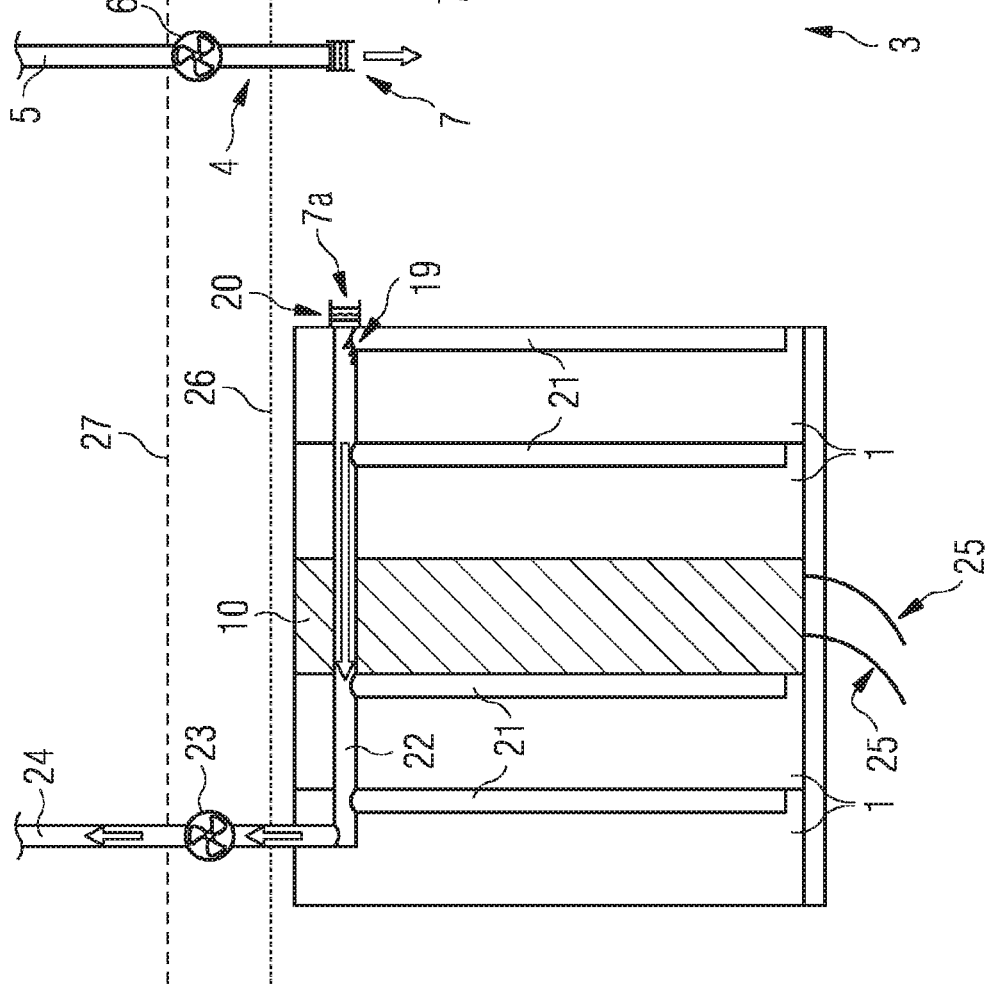

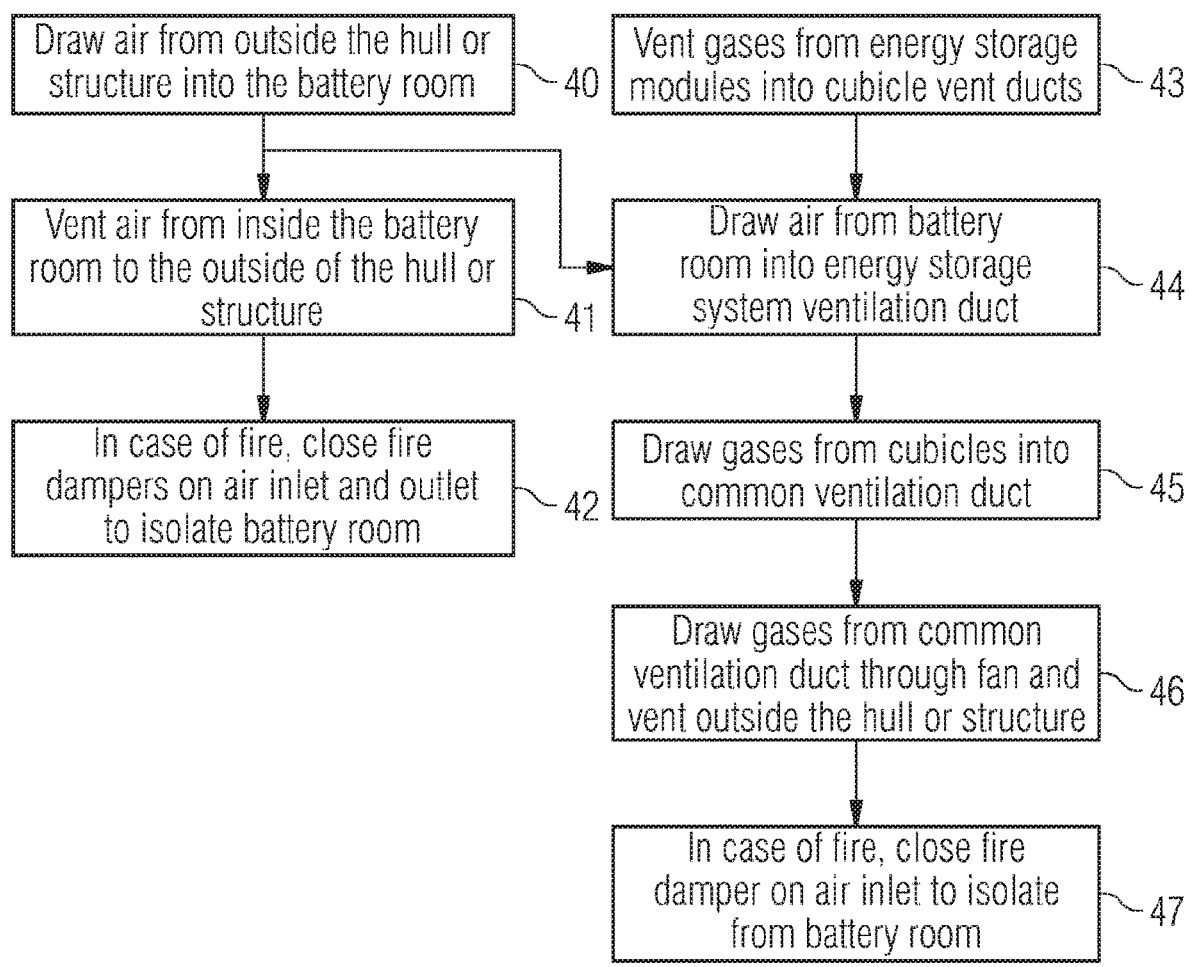

EXHAUST SYSTEM

CROSS REFERENCE TO RELATED APPLICATIONS

This application is the US National Stage of International Application No. PCT/EP2018/075028 filed 17 Sep. 2018, and claims the benefit thereof. The International Application claims the benefit of United Kingdom Application No. GB 1715391.7 filed 22 Sep. 2017. All of the applications are incorporated by reference herein in their entirety.

FIELD OF INVENTION

This invention relates to an exhaust system for energy storage modules, in particular for modules comprising an electrochemical cell, or battery, providing electrical energy to an end user.

BACKGROUND OF INVENTION

Stored electrical energy modules, or power units of various types are becoming increasingly common in many applications, in particular for use where there are environmental concerns relating to emissions in sensitive environments, or public health concerns. Stored electrical energy power units are typically used to provide electrical energy to operate equipment, to avoid emissions at the point of use, although that stored energy may have been generated in many different ways. Stored electrical energy may also be used to provide peak shaving in systems otherwise supplied from the grid, or from various types of power generation system, including diesel generators, gas turbines, or renewable energy sources. Aircraft, vehicles, vessels, offshore rigs, or rigs and other powered equipment in remote locations are examples of users of large scale stored electrical energy. Vehicle drivers may use the stored energy power unit in city centres and charge from an internal combustion engine on trunk roads, to reduce the harmful emissions in the towns and cities, or they may charge up from an electricity supply. Ferries which carry out most of their voyage relatively close to inhabited areas, or in sensitive environments are being designed with hybrid, or fully electric drive systems. Ferries may operate with stored energy to power the vessel when close to shore, using diesel generators offshore to recharge the batteries. In some countries the availability of electricity from renewable energy sources to use to charge the stored energy unit means that a fully electric vessel may be used, provided that the stored energy units are sufficiently reliable for the distances being covered, with no diesel, or other non-renewable energy source used at all. Whether hybrid, or fully electric, the stored energy units may be charged from a shore supply when docked. The development of technology to achieve stored energy units that are reliable enough for prolonged use as the primary power source must address certain technical issues.

SUMMARY OF INVENTION

In accordance with a first aspect of the present invention, an energy storage device vapour or produced gas exhaust system for a device comprising a plurality of energy storage modules, electrically connected in series in a cubicle and a plurality of energy storage cubicles, electrically connected in parallel, comprises a cubicle exhaust duct connected to each of the energy storage modules in one cubicle and an opening between each of the energy storage modules and the exhaust duct; the system further comprising a common exhaust duct connected to each cubicle exhaust duct of the plurality of cubicles; an extractor fan, a fluid inlet for the extractor fan comprising a duct connected to a source of air; and a fluid outlet for the extractor fan; wherein the extractor fan, the fluid inlet and the fluid outlet are all located at an outlet end of the common exhaust duct; wherein the cross section of the fluid inlet is smaller than the cross section of the fluid outlet; wherein an entry end of the fluid inlet and an exit end of the fluid outlet are located outside the energy storage device and outside a compartment in which the energy storage device is located; and wherein the extractor fan circulates air from the source of air and creates an under-pressure in the common exhaust duct and cubicle exhaust ducts in normal operation to guide vapour or produced gas out from the exhaust ducts.

Having the fluid inlet connected to a source of air outside an enclosure in which the energy storage device is located allows a sealed system to be produced, with no connection to the battery room on the vessel or structure, avoiding the chance of gas leakage into the battery room. Having a fluid inlet duct with a smaller cross-sectional area than the common exhaust duct, helps with generating a pressure difference at the entry to the fan. This assists air flow from the system and reduces the chance of external air damaging components of the system.

The opening between each of the energy storage modules and the exhaust duct may be relatively small, without a cover, allowing some flow of gas or air from the module to the exhaust duct. Alternatively, the opening further comprises a closure member.

The closure member may provide a gas tight seal to prevent gas from other modules from entering, but be designed to open in case of overpressure within a specific module in the event of a failure.

The compartment in which the energy storage device is located may comprise a hermetically sealed enclosure in a vessel or offshore structure. The enclosure may be in a battery room on the vessel or offshore structure.

The energy storage device may be installed on an offshore vessel or platform.

In accordance with a second aspect of the present invention, a method of exhausting gas from an energy storage device vapour or produced gas exhaust system according to the first aspect comprises providing air from the source of air outside a compartment in which the device is located to the extractor fan; whereby the extractor fan circulates the air and creates an under-pressure in the common exhaust duct and cubicle exhaust duct in normal operation to guide vapour or produced gas out from the exhaust ducts.

In the event of an overpressure in one or more of the energy storage modules, produced gas may be expelled through the exhaust system.

In a system where a gas tight seal is provided, the opening may be adapted to open when a pressure inside the energy storage module exceeds a predetermined threshold pressure and to close again when the pressure inside the energy storage module drops below the threshold pressure.

BRIEF DESCRIPTION OF THE DRAWINGS

An example of an exhaust system for energy storage modules, according to the present invention will now be described with reference to the accompany drawings in which:

FIG. 2 is a flow diagram illustrating operation of the example of FIGS. 1a and 1b;

FIGS. 3a and 3b are block diagrams illustrating an example of an exhaust and ventilation system for a modular stored energy system, seen from in front and one side respectively; and, FIG. 4 is a flow diagram illustrating operation of the example of FIGS. 3a and 3b.

DETAILED DESCRIPTION OF INVENTION

Figure 1B:
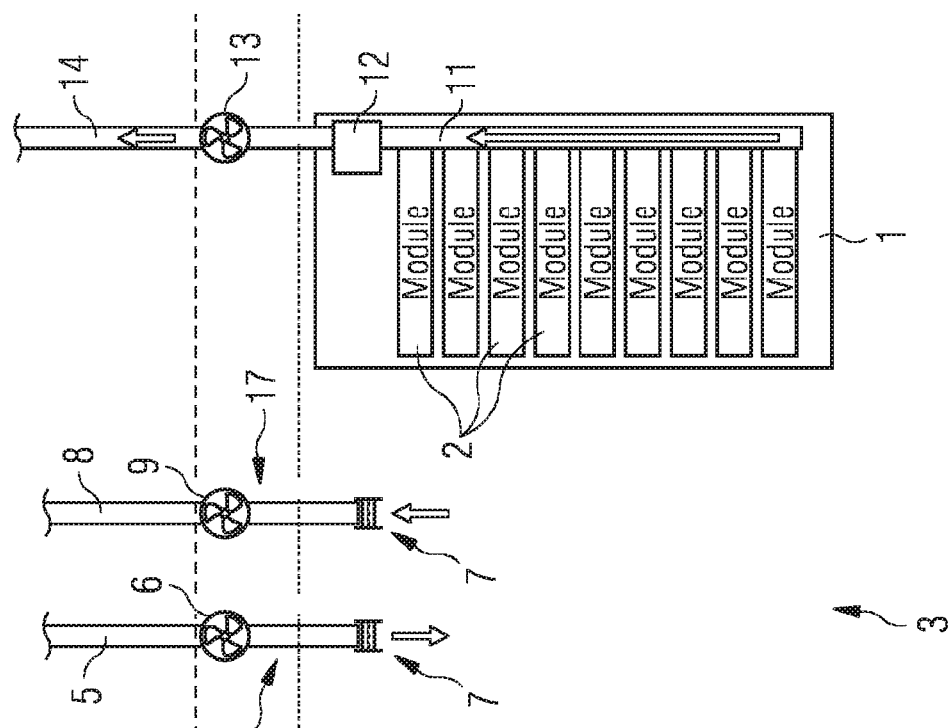
FIGS. 1a and 1b are block diagrams illustrating a first example of an exhaust system for a modular stored energy system, seen from in front and one side respectively.

Early large scale batteries were lead acid, but more recently, lithium ion batteries have been developed for electrical energy storage for large scale applications. Li-ion batteries are typically pressurised and the electrolyte is flammable, so they require care in use and storage. A problem which may occur with Li-ion batteries is thermal runaway which may be caused by an internal short circuit in a battery cell, created during manufacture. Other causes, such as mechanical damage, overcharge, or uncontrolled current may also cause thermal runaway, but the battery system design is typically adapted to avoid these. Manufacturing issues with the cells cannot be ruled out entirely, so precautions are required to minimise the effect should thermal runaway occur. In a large scale Li-ion battery system, the amount of energy that is released during a thermal runaway is a challenge to contain. A thermal event may increase temperatures in a single cell from a standard operating temperature in the range of 20° C. to 26° C. to as much as 700° C. to 1000° C. Safe operating temperatures are below 60° C., so this is a significant problem.

There are strict regulations in the marine and offshore industries regarding risk to the vessel or rig, one requirement being that there should be no transfer of excess temperature from one cell to another. If overheating occurs, then it should be contained in a single cell and not allowed to spread. In addition, for marine and offshore applications, weight and volume of any equipment is severely restricted, leading to compact, lightweight systems being advantageous. It is a challenge to produce a compact, lightweight, system that achieves the required thermal isolation and cools the cell in which excess heating occurs, quickly and efficiently.

In a Li-ion battery system, it is very important that the temperature of the battery cells does not exceed the prescribed operating temperature and that the cell temperature in the entire system is uniform. Sustained operation outside the prescribed operating temperature window may severely affect the lifetime of the battery cells and increases the risk of thermal runaway occurring.

For marine applications, there is a particular focus on using energy storage modules, such as batteries, at their maximum charge or discharge rate due to cost of installation and the weight and space taken up by the modules when on a vessel or offshore platform. Furthermore, maintenance and repair, or replacement is complicated and expensive compared to land based uses of stored energy systems, so extending the lifespan of stored energy modules is particularly important. For the example of Li-ion batteries, these are sensitive to high temperature, so it is important to ensure that the operating and ambient temperature are controlled for all cells of a Li-ion battery system to ensure the design lifetime is met. Local variations or hot spots on a single cell may also compromise the total lifetime achievable.

A common approach for large scale, marine, or offshore, stored energy systems is to use air cooling, with air flowing between cells of a battery system. An example of an air cooled battery system for a vehicle is described in JP2009225526. Another option is to use water cooling in combination with aluminium cooling fins. The water cooling is by flowing over heat exchangers and cooler blocks and the aluminium cooling fins are provided between each cell of the battery system. However, this system is not particularly efficient at removing heat and also adds substantial weight to the energy storage system. Aluminium is chosen for its thermal conductivity and relatively low cost, rather than its lightness. Heat from the batteries must pass to the aluminium cooling fins and those fins are then cooled by the liquid which loses its heat at the heat exchanger and is recirculated.

Another problem is that in a thermal event there may also be release of a large amount of flammable gasses, which may self-ignite at elevated temperatures. It is necessary to ensure that any such gases are removed safely before they can cause harm to workers, or equipment, in the room where the energy storage modules are located. Allowing whole modules to enter thermal runaway and simply controlling the resulting flames and fire with an external fire extinguishing system is unsatisfactory, as this means that there are open flames in the battery space and controlling the resulting flames and fire does not ensure safe operation and storage. Insulation material may be used to thermally isolate the cells from one another, but this may be expensive and may compromise cooling system performance, as well as adding volume. The problem of release of flammable gas may be handled by providing a pressure valve in the module casing, releasing the gas at a certain pressure, either into the room or into a separate exhaust system. However, as referred to above, release into the room does not protect workers or other equipment. Significant extra costs would be incurred due to constraints on construction of the room and the equipment in it, to be able to handle the release of gases from the energy storage modules directly into the room. Thus, an effective exhaust system is required and in particular, one which is able to respond to sudden temperature increases, such as may occur during thermal runaway.

Furthermore, the classification societies may apply a requirement that a water cooled energy storage system must include a separate exhaust or ventilation system to remove possible vapour. It is normal practice that in the event of a fire outside the energy storage system, for example, an electrical fire in cables in the room, the room ventilation system shuts down, whereas in the event of a battery thermal runaway event, it is necessary for an exhaust fan in an exhaust or ventilation system to continue to run. There is a conflict between these two requirements and typically, this means that the battery exhaust system must be prevented from taking air from the battery room in the event of an external fire.

In terms of removal of exhaust gasses from an energy storage system, releasing gas into an exhaust gas system that vents the gas directly into the room is not desirable in marine and offshore applications. Using separate ventilation systems is an option, but if one air inlet of the two separate ventilation systems is connected to the battery ventilation system and the other air inlet is in the battery room, then both the battery room and the inlet temperature must have temperature and humidity control to ensure that condensation does not occur within the battery system with cooling water temperature of approx. 15° C. to 20° C. Condensation must be avoided, as it has the potential to cause damage to equipment, with corresponding downtime, if the weather conditions, such as warm weather and relative humidity, raise the system temperature above the dew point of air, so that water condenses on the system. The exhaust system in the battery must have an air outlet that goes through the hull, or outer structure, of the vessel or rig and opens up well away from any muster points. The same applies to the battery room ventilation system, any air outlet through the hull, or outer structure of the vessel or rig must open up well away from any muster points. Using two separate ventilation systems, adds cost and bulk to the system for the shipbuilder.

In a first embodiment, the present invention addresses these problems by providing a closed exhaust system, which is air tight in the interface between battery and module and the edges of the exhaust channels and the battery room ventilation, so that the exhaust may be completely isolated from the battery room ventilation. The battery exhaust system includes an exhaust fan that always circulates air from the vessel's surroundings and creates an under-pressure in the battery piping. Typically, this pressure may be in the range of 200 Pa to 360 Pa, but is not limited to this. The under-pressure helps guide the produced gas out from the exhaust piping and into the exhaust. The inlet pipe for the exhaust fan has a smaller cross section than the outlet pipe and the ratio between the two cross sections is defined to give the desired under-pressure in the battery system. For example, an 80 mm inlet pipe diameter and 100 mm outlet pipe diameter may be used, or scaled up or down as required depending on the length of pipe from the battery room, providing that the inlet pipe has a smaller cross section that the outlet pipe. For example offshore rigs typically have a longer pipe length than ferries.

In the case of an external fire, the exhaust system of the energy storage system modules, for example battery modules, remains unaffected. The interface between battery modules and the exhaust and the battery room is sealed, so that the exhaust is isolated from the battery room in case of an external fire. Sealing the interface makes the system safer by ensuring that gasses do not leak into the room in a thermal runaway situation. The air inlet and air outlet for the exhaust system are advantageously both on the outside of the vessel, or structure, located in a non-critical area of the vessel, or structure and directed away from working personnel, or locations where personnel may gather. Optionally, after a thermal runaway event, the system may be flushed by opening a lid on the cubicle exhaust and running the extractor fan.

Figure 1A:
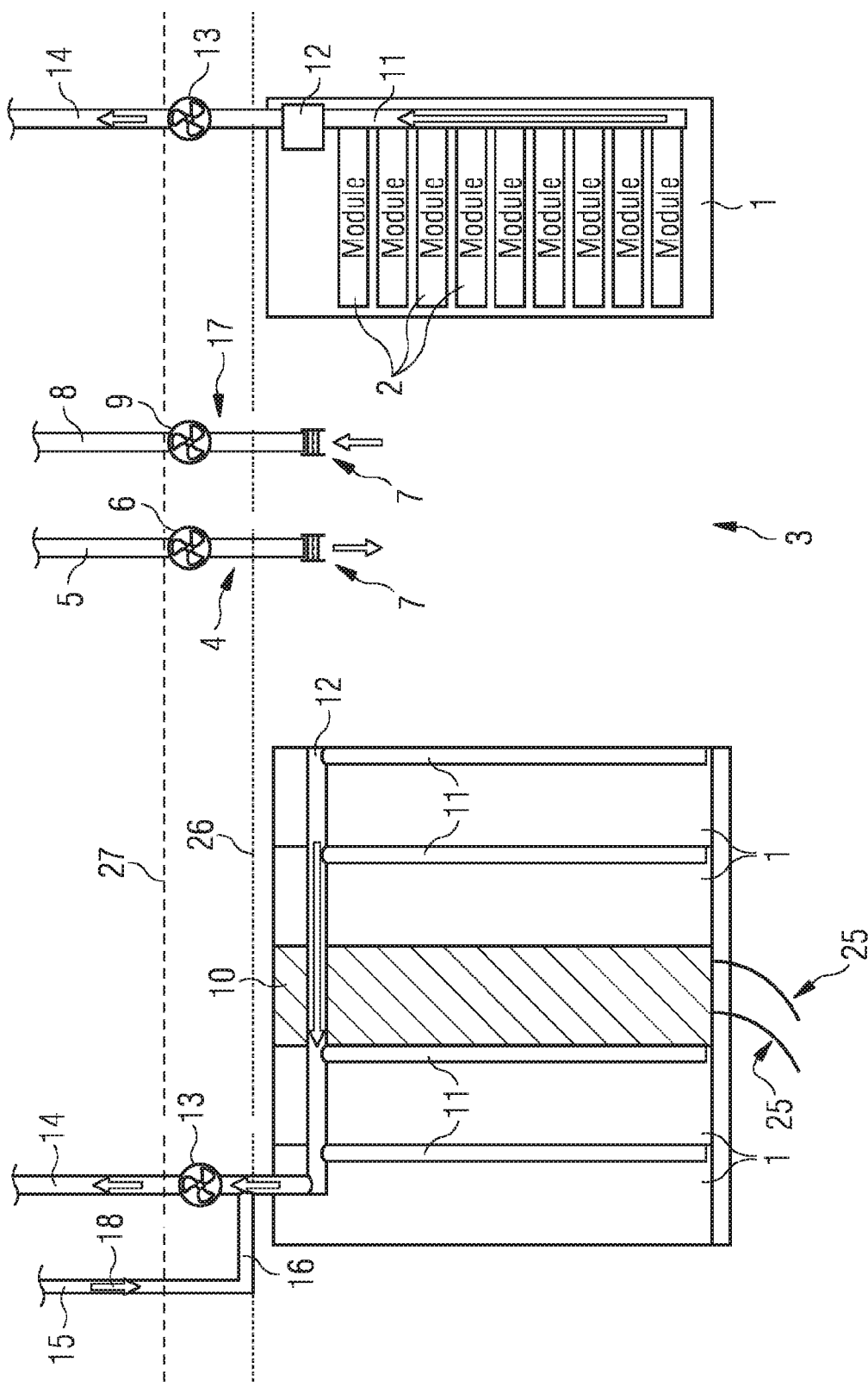

FIGS. 1a and 1b illustrate an example of the first embodiment. A plurality of energy storage cubicles 1, typically comprising a plurality of series connected energy storage modules, for example batteries 2, connected in parallel, are located in a room 3 on the vessel, or platform. For convenience, multiple cubicles may have a common control and cable connection cubicle 10 within the run of cubicles. Power cables 25 connect the battery system to the rest of the power system of the vessel. This control cubicle enables power to be transferred between the battery cubicles and consumers on the vessel or structure, as well as data exchange to monitor the battery charging and discharging state.

The battery room 3 is ventilated by means of an air inlet 4 comprising ducting, or piping 5 projecting outside the room 3 and a fan in the ducting to drive air into the room. At the room end of the piping a fire damper 7 is installed, so that in the event of a fire in the battery room, the fire cannot spread outside the room through the piping 5. A similar construction is used for the air outlet 17 from the battery room 3 with ducting 8 projecting outside the room and a fan 9 in the ducting to drive the air out of the room 3. The line 26 indicates separation of the battery room and the rest of the vessel. The line 27 indicates the hull of the vessel. Although, for clarity, the figures show pipes 5, 8, 14, 15 protruding from the hull, in practice this may not be the case, but is simply an indication of exposure to air outside the vessel hull.

Each energy storage cubicle 1 comprises a plurality of energy storage modules 2, in this example, batteries, connected together in series within the cubicle. The batteries 2 of each cubicle 1 vent into a cubicle exhaust duct 11 and thence to a common exhaust pipe 12. A fan 13 is provided in an outlet at the end of the common exhaust pipe 12 to encourage the flow of exhaust gases from the battery cubicles in the direction of the outlet. Without a fan, it would be necessary to simply rely on overpressure driving gas out of the exhaust pipes. Overpressure occurs in a system where the fan is not running, simply relying on the increased pressure created by the gas production in the module to guide the gasses out of the system. This will be the case if the fan is not running. However, if the fan is not running in normal operation, then damp or salty air from outside the vessel or platform may enter through air inlet 15 or air outlet 14 and pass through the ducts to the modules causing corrosion in the system, or damage to the electronics. Thus, even in normal operation, it is desirable to run the fan. The dimensions of the exhaust pipes in the cubicles, the common exhaust, the inlet and outlet are chosen to achieve a desired underpressure in the system to assist the flow. Typical dimensions for the inlet pipe are in the range of 80 mm to 100 mm, with a corresponding outlet pipe in the range of 100 mm to 120 mm. As previously indicated, the inlet pipe has a smaller cross section than the outlet pipe, but the precise values are not limited to this range. Underpressure is established in the piping on the battery side of the fan, and will be distributed through the complete system down to the last battery cubicle.

The outlet 14 passes into a location outside the battery room and advantageously outside the hull or structure, well away from any safety critical locations in use by personnel. An inlet 15 allows an inlet air flow, as indicated by the arrow 18, from outside the hull, or structure, to feed the fan 13 to assist the flow of exhaust gas from the cubicles. This inlet air is only taken from the hull side, or from outside the structure, rather than from the battery room, or through the battery room. A sealing package is used to make sure that the location at which the plastic plate on the module side and the metal of the exhaust channel meet is air tight.

The design has the advantages that the battery exhaust system 11, 12, 14 is separated from the battery space, reducing the need for two separate air inlets 4 for the battery room, with temperature control. This reduces cost and space requirements. By introducing an inlet air flow 18 to the fan 13, any regulation problems with the battery room extractor fan 9 can be avoided. Without air inlet 18 directly to the exhaust fan, the air pulled through the fan 13 would have to come from the room 3. If the air inlet to the room and the air inlet to the fan have different capacities or power supply conditions, there may be a regulation problem between the two fans. Normally, this type of fan does not have a variable frequency drives to regulate the RPM of the fan. If the two fans were not synchronised in terms of power and flow rate, m3/h, there may be a resulting under-pressure or over-pressure in the room and an unpredictable ventilation situation in the room. Downtime of the system due to condensation or salt water effects may be avoided.

FIG. 2 is a flow diagram of a method of operating the system of the first embodiment shown in FIGS. 1a and 1b. For the room ventilation, air, which is at the temperature of the external environment (generally relatively cool, compared to the temperature within the battery room) is drawn 30 through the fan 6 and fire damper 7 of the air inlet 4 into the battery room 3. Airflow is generated within the room 3 by means of the circuit formed by having an extraction fan in the air outlet 17, which draws air from the room (generally relatively warm, compared to the temperature of the inlet air) through fire damper 7 to vent 31 the air from the outlet pipe 8 to a safe location outside the hull or structure. In the event of a fire outside the room, the inlet fire damper may be closed. In the event of a fire inside the room, the outlet fire damper may be closed. Quite independently of the room ventilation, an exhaust system is provided for the energy storage module cubicles. The ventilation of the battery room via inlet 5 and outlet 8 is generally part of a larger ventilation system (HVAC) that ventilates several other rooms on the vessel. The battery space/room temperature is typically between 5° C. and 40° C., as this is standard for other machinery spaces. There may be some humidity constraints in the battery space, but not always. Vessels commonly climate control on the ventilation so the temperature can be controlled.

During operation of the energy storage system, some of the batteries may generate gases which need to be removed from the energy storage module safely. The gases are vented 32 from the battery housing into the cubicle exhaust duct 11, either through a small opening which is present in the housing, or by forcing open a closure member, or valve, provided to stop gases from another module entering. For example, at the junction of the energy storage module housing with the cubicle exhaust duct 11, the closure valves may be arranged to prevent gases or flames in the exhaust duct from one battery module from entering another battery module, as described in more detail below. The gases in each cubicle exhaust duct 11 feed 33 into a common exhaust duct 12, typically having a larger cross section than each of the cubicle exhaust ducts individually. Air from outside the hull or structure is fed 34 into the base of the extraction fan 13 and assists in the extraction by generating a pressure difference to draw the gases in the ducts 11, 12 to the outside, through fan 13 and the outlet pipe 14.

Conventionally, batteries have been free to vent gas, or to receive air from the battery room to cool the batteries, but this has the potential to allow dangerous gasses into the battery room if a thermal event should occur. Furthermore, using air cooling, or ventilation, of a conventional nature in the battery room of an offshore installation, for example through a designated air inlet from outside the vessel or platform, exposes delicate electronic systems to salt and high humidity which reduces the overall lifespan of the components. There is also the risk that in the event of a fire elsewhere on the vessel or structure the smoke, fire, or elevated temperatures put the battery cells at risk.

As described above, the present invention addresses this problem by using modules which vent into the exhaust system, relying on the underpressure created by the air inlet and extractor fan and do not need to use the battery room as an air inlet for the exhaust system. Thus, smoke or flames from events elsewhere on the vessel or platform are not drawn into the energy storage modules via a ventilation system. The example of FIG. 1a does not allow any air flow between the battery system 50 and the battery room 3. The initial underpressure formed in the system for encouraging the removal of vapour, for example from condensation, in normal operation, is rapidly turned into an overpressure if a fault in a module 2 causes the module to vent into one of the exhaust channels 11, 12. This overpressure then forces most of the gasses out of the system 50. The air inlet and extractor fan arrangement may also be used to assist in flushing such gases from the system. The underpressure may also prevent any external air that does come into the common exhaust duct from flowing toward the battery modules and causing corrosion or other damage.

In the example of FIG. 3a, described in more detail below, there is constant air flow between the battery room and the ventilation system in normal operation, but if a module vents into one of the channels 21, 22, then there is a the fire damper, one way valve, or overpressure valve 7a between the battery room and the ventilation channel 22 that closes and again the overpressure in the system will force the majority of the gaseous atmosphere out of the exhaust. This example does not have the benefit of keeping the battery room and energy storage system completely separate.

An alternative to the closed exhaust system of FIGS. 1a and 1b is illustrated in FIGS. 3a and 3b. As in the previous example, a plurality of cubicles 1 are connected in parallel, each cubicle containing a plurality of energy storage modules 2 connected in series. For convenience, multiple cubicles may have a common control and cable connection cubicle 10 within the run of cubicles to enable power to be transferred between the battery cubicles and consumers on the vessel or structure, as well as data exchange to monitor the battery charging and discharging state.

The battery room 3 may be ventilated by means of an air inlet 4 comprising piping 5 projecting outside the room 3 and a fan 6 in the piping to drive air into the room. At the room end of the piping a fire damper 7 is installed, so that in the event of a fire in the battery room, the fire cannot spread outside the room through the piping 5. A similar construction is used for the air outlet 17 from the battery room 3 with piping 8 projecting outside the room and a fan 9 in the piping to drive the air out of the room 3.

The example of FIGS. 3a and 3b is provided with an overpressure valve 19 in the form of an adjustable vent for the air inlet, which will close if the pressure inside the cubicle becomes high and a fire-damper 7 incorporated into the battery ventilation system air inlet 20, which takes air from the battery room 3 to drive exhaust fan 23 in the outlet pipe 24. Thus, the battery cubicles and their exhaust systems may be separated completely from the ventilation system of the battery room, if required. The battery exhaust system comprises an extractor fan that is always running, creating a certain under-pressure in the battery piping 21, 22, 24, thereby pulling a pre-defined amount of air through the air inlet 20. Thus, circulation of air in the battery room into the ventilation system of the battery cubicles is permitted in normal operation, but in the event of a thermal runaway, the overpressure valve 19 closes the cubicle ventilation system off from the battery room, to avoid flammable, or toxic, gasses getting into the battery room.

In the case of an external fire arising, the fire damper 7a will close and isolate the extractor fan 23 and battery exhaust 21, 22, 24 from the external fire. The overpressure will increase in the channel system, i.e. the exhaust piping inside the battery system or on the battery side of the fan 23. In addition, frequency control may be provided on the extractor fan 23 to regulate the speed of rotation of the fan (rpm) and air flow through the exhaust system. An interface (not shown) between modules in each cubicle and the exhaust 21 needs to be sealed (opening only in the event of a thermal runaway in the module), so that the exhaust 21, 22, 24 is isolated from the battery room 3 in case of an external fire. Sealing the interface adds safety to the system by ensuring that gasses are not leaked into the room 3 in a thermal runaway situation. After a thermal runaway event the ventilation system 21, 22, 24 can be flushed by opening a lid on the cubicle exhaust and running the extractor fan 23, or by removing a module from the system, opening the exhaust interface and exposing the exhaust system to the battery room. Then by running the fan, air flows from the room to the exhaust and out.

The battery exhaust system in this embodiment makes use of the room air inlet 5, reducing the need for two separate air inlets with temperature control, yet addresses the concerns about spread of fire or noxious gases by including a fire damper 7a and overpressure valve 19 on the air inlet 20 of the ventilation system. Sealing the interface between module and exhaust, as referred to above, increases safety and reduces risk for leakage of flammable gasses to the battery space. The design reduces downtime due to possible condensation issues, as compared with other options for the ventilation system.

FIG. 4 is a flow diagram of a method of operating the system of the second embodiment shown in FIGS. 3a and 3b. For the room ventilation, air, which is at the temperature of the external environment (generally relatively cool, compared to the temperature within the battery room) is drawn 40 through the fan 6 and fire damper 7 of the air inlet 4 into the battery room 3. Airflow is generated within the room 3 by means of the circuit formed by having an extraction fan in the air outlet 17, which draws air from the room (generally relatively warm, compared to the temperature of the inlet air) through fire damper 7 to vent 41 the air from the outlet pipe 8 to a safe location outside the hull or structure. In the event of a fire outside the room, the inlet fire damper may be closed 42. In the event of a fire inside the room, the outlet fire damper may be closed 42.

In addition, a ventilation system is provided for the energy storage module cubicles, which is able to draw 44 air from the battery room 3 through an inlet 20 provided with a fire damper 7a, as long as the conditions are appropriate, i.e. that there is no fire or other situation which might cause the fire dampers to close off 47 the air inlet 20 to the energy storage system. During operation of the energy storage system, any gases which need to be removed from the energy storage module vent 43 into the cubicle ventilation duct 21, which may be provided with closure valves arranged to prevent gases or flames in the ventilation duct from one battery module from entering another battery module. The gases in each cubicle ventilation duct 21 are drawn 45 into the common ventilation duct 22, which typically has a larger cross section than each of the cubicle ventilation ducts individually. An overpressure valve 19 may close off the cubicle ventilation duct 21 from the air inlet 20 from the battery room in the case of flammable gases being produced by the energy storage modules 2. The fan continues to operate as normal. Produced gas flows out from the module into the cubicle exhaust and out. When the produced gas has been removed, there will no longer be an overpressure in the cubicle, or in the common exhaust, and the overpressure valve opens to allow air flow from the battery room through to the exhaust fan 23 again. In normal operation, the air from the battery room flows through the common ventilation duct 22 and the extractor fan 23 draws gases from the cubicle ventilation ducts into the common ventilation duct and vents 46 them outside through outlet pipe 24.

Although the detailed examples have been given with respect to electrochemical cells, such as batteries, for example Li-ion, alkaline, or NiMh batteries, or others, the invention applies to other types of stored energy units, in particular non-cylindrical capacitors, ultracapacitors, or supercapacitors, fuel cells, or other types of energy storage which have a surface that can be cooled by a cooler and which may also suffer if the temperature of modules of the stored energy units regularly goes outside an advantageous operating range, reducing the overall lifetime and increasing maintenance costs. For a vessel, or system, relying on stored energy as its primary, or only power source, reliability is particularly important and optimising operating conditions is desirable.

An energy storage device ventilation system for a device comprising a plurality of energy storage modules, electrically connected in series in a cubicle and a plurality of energy storage cubicles, electrically connected in parallel may comprise a cubicle ventilation duct connected to each of the energy storage modules; a common ventilation duct connected to each cubicle ventilation duct; a fluid inlet and a fluid outlet, wherein the fluid outlet comprises an extractor fan and an outlet duct; and wherein the fluid inlet feeds air to the extractor fan. The fluid inlet may comprise a duct connected to a source of air within an enclosure in which the energy storage device is located. This reduces the number of through hull fittings for air inlets by making use of air already drawn into the battery room. The duct may be integral with an end of the common ventilation duct remote from the extractor fan and comprises an opening into the enclosure. The common ventilation duct may further comprise at least one of a fire damper on the opening or an overpressure valve.

A method of ventilating an energy storage device comprising a plurality of energy storage modules, electrically connected in series in a cubicle and a plurality of energy storage cubicles, electrically connected in parallel; may comprise providing a cubicle ventilation duct connected to each of the energy storage modules; a common ventilation duct connected to each cubicle ventilation duct; a fluid inlet and a fluid outlet; feeding air to an extractor fan in an fluid outlet duct whereby gases from each energy storage module are drawn into the cubicle ventilation duct and from the cubicle ventilation duct to the common ventilation duct; through the extractor fan to an outlet.

Air may be fed to the extractor fan from inside an enclosure in which the energy storage device is located. A temperature rise, in the enclosure, may be detected, or a signal from a fire alarm, or gas alarm, may be received; and a fire damper caused to close off the air supply to the extractor fan. An overpressure valve may be closed when an overpressure relative to the battery space is present in the exhaust duct, to prevent transmission of the gases into the enclosure.

The invention claimed is:

1. An exhaust system for vapour or produced gas from an energy storage device, the energy storage device comprising a plurality of energy storage modules, electrically connected in series in a cubicle and a plurality of energy storage cubicles, electrically connected in parallel; the exhaust system comprising:
   a cubicle exhaust duct connected to each of the energy storage modules in one cubicle and an opening between each of the energy storage modules and the exhaust duct;
   a common exhaust duct connected to each cubicle exhaust duct of the plurality of cubicles;
   an extractor fan, a fluid inlet for the extractor fan comprising a duct connected to a source of air; and a fluid outlet for the extractor fan; wherein the extractor fan, the fluid inlet and the fluid outlet are all located at an outlet end of the common exhaust duct;

wherein a cross section of the fluid inlet is smaller than a cross section of the fluid outlet;

wherein an entry end of the fluid inlet and an exit end of the fluid outlet are located outside the energy storage device and outside a compartment in which the energy storage device is located; and wherein the extractor fan circulates air from the source of air and creates an under-pressure in the common exhaust duct and cubicle exhaust ducts during operation to guide vapour or produced gas out from the exhaust ducts.

2. The exhaust system according to claim 1,
wherein the opening further comprises a closure member.

3. The exhaust system according to claim 1,
wherein the compartment in which the energy storage device is located comprises a hermetically sealed enclosure in a vessel or offshore structure.

4. The exhaust system according to claim 1,
wherein the energy storage device is installed on an offshore vessel or platform.

5. A method of exhausting vapour or produced gas from an energy storage device using the exhaust system according to claim 1; the method comprising:

providing air from a source of air outside a compartment in which the energy storage device is located to the extractor fan;

circulating the air via the extractor fan and creating an under-pressure in the common exhaust duct and cubicle exhaust duct during operation to guide vapour or produced gas out from the exhaust ducts.

6. The method according to claim 5, further comprising:

in the event of an overpressure in one or more of the energy storage modules, expelling produced gas through the exhaust system.

* * * * *